(12) United States Patent  
Richter

(10) Patent No.: US 12,175,796 B2
(45) Date of Patent: Dec. 24, 2024

(54) ASSISTED EXPRESSIONS

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 379 days.

(21) Appl. No.: 17/496,517

(22) Filed: Oct. 7, 2021

(65) Prior Publication Data

US 2022/0027604 A1 Jan. 27, 2022

Related U.S. Application Data

(63) Continuation of application No. PCT/US2020/038421, filed on Jun. 18, 2020.

(60) Provisional application No. 62/867,544, filed on Jun. 27, 2019.

(51) Int. Cl.
*G06V 40/00* (2022.01)
*G06T 11/60* (2006.01)
*G06V 40/16* (2022.01)

(52) U.S. Cl.
CPC ............ *G06V 40/176* (2022.01); *G06T 11/60* (2013.01); *G06V 40/166* (2022.01); *G06V 40/171* (2022.01)

(58) Field of Classification Search
CPC .. G06V 40/176; G06V 40/166; G06V 40/171; G06V 40/174; G06T 11/60; G06T 19/006; G06F 3/011
See application file for complete search history.

(56) References Cited

U.S. PATENT DOCUMENTS

| 10,636,192 | B1* | 4/2020 | Saragih | G06V 40/164 |
| 11,861,255 | B1* | 1/2024 | Ive | G06V 40/174 |
| 2018/0247443 | A1* | 8/2018 | Briggs | G06T 13/205 |
| 2019/0126152 | A1* | 5/2019 | Taylor | H04L 51/10 |
| 2020/0168205 | A1* | 5/2020 | Rakshit | G06N 5/022 |

FOREIGN PATENT DOCUMENTS

| CN | 107735776 A | 2/2018 |
| CN | 108898068 A | 11/2018 |
| CN | 109670385 A | 4/2019 |

OTHER PUBLICATIONS

PCT International Search Report and Written Opinion dated Oct. 9, 2020, International Application No. PCT/US2020/038421, pp. 1-12.
Chinese Office Action for corresponding Chinese Appl. No. 202080026298.7 dated Mar. 7, 2024.

* cited by examiner

*Primary Examiner* — Ping Y Hsieh
(74) *Attorney, Agent, or Firm* — Fernando & Partners, LLP

(57) ABSTRACT

A method includes displaying, via a display, an environment that includes a representation of a person associated with the device. The representation includes a virtual face with virtual facial features corresponding to respective physical facial features of the person associated with the device. The method includes detecting, via a sensor, a change in a physical facial feature of the person associated with the device. The physical facial feature indicates a physical facial expression of the person. In response to determining that the physical facial expression breaches a criterion, modifying one or more virtual facial features of the virtual face so that the virtual face indicates a virtual facial expression that satisfies the criterion.

20 Claims, 13 Drawing Sheets

400

| 410 | Display environment including representation of person having virtual face with virtual facial features corresponding to person's physical facial features |

Detect change in physical facial feature indicating physical facial expression / determine whether first criterion is satisfied

- Detect appearance of physical ridge or physical indentation 420a
- 1st criterion comprises height of physical ridge breaching threshold 420b
- 1st criterion comprises depth of phys. indentation breaching threshold 420c

- Detect change in eyebrow shape 420d
- Change in eyebrow shape breaches threshold 420e

- Detect change in pupil size 420f
- Change in pupil size breaches threshold 420g

- Detect change in skin color 420h
- Change in skin color breaches threshold 420i

- Detect perspiration 420j
- Amount of perspiration breaches threshold 420k

```
                    ┌─────────────────────────────────┐
                    │     Continued from FIG. 4A      │
                    └─────────────────────────────────┘
                                    │
                                    ▼
┌──────────────────────────────────────────────────────────────────┐
│ Obfuscate physical facial expression by modifying virtual facial │
│                     feature of virtual face                      │
│   ┌──────────────────────────────────────────────────────────┐   │
│   │           Determine scaling factor 430a                  │   │
│   └──────────────────────────────────────────────────────────┘   │
│                                                                  │
│   ┌──────────────────────────────────────────────────────────┐   │
│   │  Modify virtual facial feature based on scaling factor   │   │
│   │   and detected change in physical facial feature 430b    │   │
│   └──────────────────────────────────────────────────────────┘   │
│                                                                  │
│   ┌──────────────────────────────────────────────────────────┐   │
│   │  Virtual facial expression is scaled version of physical │   │── 430
│   │              facial expression 430c                      │   │
│   └──────────────────────────────────────────────────────────┘   │
│                                                                  │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
│     Modify virtual facial feature based on identity associated   │
│   │  with representation of person in environment 430d       │   │
│     ┌──────────────────────────────────────────────────────┐     │
│   │ │ Amplify virtual facial feature if identity is in     │ │   │
│     │           contact database 430e                      │     │
│   │ └──────────────────────────────────────────────────────┘ │   │
│     ┌──────────────────────────────────────────────────────┐     │
│   │ │ Dampen virtual facial feature if identity is not in  │ │   │
│     │           contact database 430f                      │     │
│   │ └──────────────────────────────────────────────────────┘ │   │
│     ┌──────────────────────────────────────────────────────┐     │
│   │ │ Modify virtual facial feature based on scaling       │ │   │
│     │       factors for multiple identities 430g           │     │
│   │ └──────────────────────────────────────────────────────┘ │   │
│   └ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
│                                                                  │
│   ┌──────────────────────────────────────────────────────────┐   │
│   │ Perform random/pseudorandom modification to virtual      │   │
│   │                 facial feature 430h                      │   │
│   │  ┌────────────────────────────────────────────────────┐  │   │
│   │  │ Perform random/pseudorandom modification to virtual│  │   │
│   │  │ facial feature if environment corresponds to a     │  │   │
│   │  │                    game 430i                       │  │   │
│   │  └────────────────────────────────────────────────────┘  │   │
│   └──────────────────────────────────────────────────────────┘   │
│                                                                  │
│   ┌──────────────────────────────────────────────────────────┐   │
│   │ Scale height of virtual ridge relative to height of      │   │
│   │              physical ridge 430j                         │   │
│   └──────────────────────────────────────────────────────────┘   │
│                                                                  │
│   ┌──────────────────────────────────────────────────────────┐   │
│   │ Scale depth of virtual indentation relative to height of │   │
│   │           physical indentation 430k                      │   │
│   └──────────────────────────────────────────────────────────┘   │
└──────────────────────────────────────────────────────────────────┘
                                    │
                                    ▼
                    ┌─────────────────────────────────┐
                    │       Continues on FIG. 4C      │
                    └─────────────────────────────────┘
```

FIG. 4B

ASSISTED EXPRESSIONS

CROSS-REFERENCE TO RELATED APPLICATION

This application is a continuation of Intl. Patent App. No. PCT/US2020/38421, filed on Jun. 18, 2020, which claims priority to U.S. Provisional Patent App. No. 62/867,544, filed on Jun. 27, 2019, which are both hereby incorporated by reference in their entirety.

TECHNICAL FIELD

The present disclosure generally relates to extended reality environments.

BACKGROUND

Some devices are capable of presenting an environment through which a user can interact with other entities via a network, such as the Internet. Some such devices may transmit a representation of the user to an entity with which the user is interacting. Some environments may include representations of different people. The representations of different people may interact with each other at the direction of the people controlling the representations.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4C are flowchart representations of a method of synthesizing a modified image data frame in accordance with some implementations.

Figure 1:
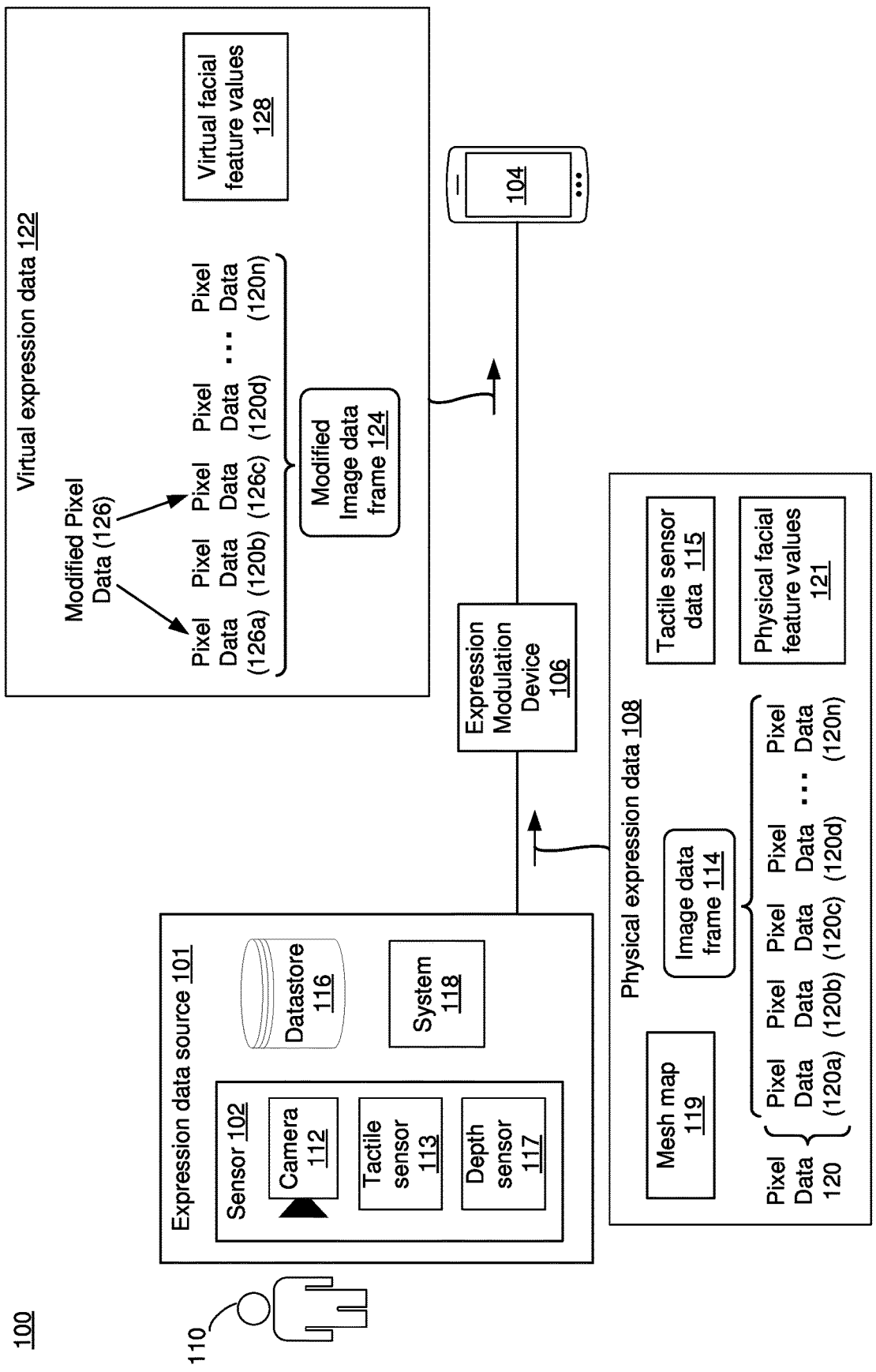
FIG. 1 illustrates an exemplary operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for modifying a physical facial expression of a user. In various implementations, a device includes a sensor, a display, a non-transitory memory, and one or more processors coupled with the non-transitory memory. In some implementations, a method includes displaying, via the display, an environment that includes a representation of a person associated with the device. The representation includes a virtual face with virtual facial features corresponding to respective physical facial features of the person associated with the device. The method includes detecting, via the sensor, a change in one or more of the physical facial features of the person associated with the device. The physical facial features indicate a physical facial expression of the person. In response to determining that the physical facial expression breaches a criterion, a virtual facial expression is modified by modifying one or more of the virtual facial features of the virtual face so that the virtual face indicates a virtual facial expression that satisfies the criterion.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for modifying a perception of a user's physical facial expression by modifying one or more virtual facial features of an XR representation of the user's face. Instead of mimicking the user's physical facial expressions or displaying an expressionless face, the XR representation can express a modified version of the user's physical facial expression. A perception of the physical facial expression can be modified by amplifying a corresponding virtual facial expression. The perception of the physical facial expression can be modified by dampening the corresponding virtual facial expression. In some implementations, the user can control the amount of modification. In some implementations, the amount of modification can be selected as a function of the XR environment. In some implementations, the amount of modification can be selected randomly or pseudorandomly.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

In some implementations, a device can present an extended reality (XR) environment through which a user can interact with other entities via a network, such as the Internet. The device may transmit an XR representation of the user to an entity with which the user is interacting. In some implementations, the device includes sensors that can detect a user's physical facial expression. The XR representation of the user can mimic the user's physical facial expression.

In some cases, however, it may not be desirable for the XR representation of the user to mimic the user's physical facial expression. For example, some users may be characterized by neurological, behavioral, medical, or other impairments that adversely affect their ability to produce physical facial expressions that are representative of emotional states they may wish to convey. In some implementations, the user can disable expression mimicking and render the XR representation expressionless. In some implementations, an expression modulation device synthesizes a modified version of the user's physical facial expression in order to modify the corresponding virtual facial expression, e.g., to enhance the user's ability to convey emotional states via the user's XR representation. Accordingly, the user's control over the XR representation is enhanced by facilitating control beyond enabling and disabling physical facial expression mimicking. The user's ability to communicate nonverbally is enhanced by facilitating the display, in an XR environment, of facial expressions that the user may find difficult or impossible to physically produce.

In some implementations, the expression modulation device synthesizes a modified version of the user's physical facial expression, e.g., to assist the user in emulating a target facial expression. For example, in an entertainment application, the expression modulation device may assist the user in emulating a facial expression that is displayed by another XR representation in an XR environment or in producing a facial expression that satisfies a criterion, e.g., a happiness criterion.

As another example, in some implementations, the expression modulation device assists the user in portraying a fictional character in a fictional work, such as a television show or movie. The fictional character may have a target facial expression or a target emotional state. In some implementations, the expression modulation device synthesizes an XR representation that displays a virtual facial expression that is within a degree of similarity to the target facial expression or the target emotional state.

In some implementations, the expression modulation device modifies a perception of the physical facial expression by dampening the corresponding virtual facial expression. For example, if the physical facial expression indicates a degree of fear that exceeds a threshold, e.g., a fear threshold, the expression modulation device synthesizes an XR representation that exhibits a dampened version of the user's physical facial expression. Accordingly, the XR representation of the user displays a virtual facial expression that appears less fearful than the user's physical facial expression.

In some implementations, the expression modulation device modifies a perception of the physical facial expression by amplifying the physical facial expression. For example, if the physical facial expression indicates a mild smile that is below a threshold, e.g., a happiness threshold, the expression modulation device synthesizes an XR representation that exhibits an amplified version of the user's physical facial expression. Accordingly, the XR representation of the user displays a virtual facial expression that appears happier than the user's physical facial expression.

In some implementations, the user can control the degree of modification, e.g., the degree to which the perception of the user's physical facial expression is dampened or amplified to generate a virtual facial expression that is displayed on the XR representation. In some implementations, the degree of modification is a function of an XR environment, such as a mood or a formality setting. In some implementations, modifying the user's physical facial expression includes generating a random or pseudorandom virtual facial expression that is displayed on the XR representation.

In some implementations, the degree of modification is a function of a time period (e.g., a historical time period) associated with the XR environment. For example, if the XR environment is associated with an era in which people were more formal, then the degree of modification is relatively high. In some examples, if the XR environment is associated with an era in which people were less formal, then the degree of modification is relatively low.

In some implementations, the modification is a function of a location associated with the XR environment. For example, if the XR environment is associated with a particular geographical area where people exhibit certain types of expressions, then modifying the physical facial expression includes translating the physical facial expression into a virtual facial expression that is within a degree of similarity to expressions exhibited in that particular geographical area. In some implementations, the location associated with the XR environment refers to a location of at least some of the persons represented in the XR environment. For example, if most of the people represented in the XR environment are located in France, then the XR environment is associated with France. In this example, modifying a physical facial expression includes translating the physical facial expression into a virtual facial expression that is within a degree of similarity of physical facial expressions exhibited in France.

FIG. 1 illustrates an exemplary operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes an expression data source 101, a client device 104, and an expression modulation device 106. In the example of FIG. 1, the expression modulation device 106 is shown as being separate from the expression data source 101 and the client device 104. However, in some implementations, the expression modulation device 106 and the expression data source 101 are integrated into a single device. Alternatively, in some implementations, the expression modulation device 106 is integrated into the client device 104. In some implementations, the expression modulation device 106 resides at (e.g., is integrated into) a server (e.g., an enterprise server that is controlled by an enterprise).

In various implementations, the expression data source 101 provides physical expression data 108 of a user 110 to the expression modulation device 106. In some implementations, the expression data source 101 includes a sensor 102. In some implementations, the sensor 102 includes a camera 112 that captures an image data frame 114, e.g., representing a face of the user 110. In some implementations, the camera 112 is integrated into another device, such as a mobile computing device (e.g., a smartphone or a tablet). In some implementations, the expression data source 101 includes a datastore 116 which may store the image data frame 114. In some implementations, the expression data source 101 includes an extended reality (XR) system 118 which generates an XR experience, of which the image data frame 114 may be a part. The datastore 116 and/or the XR system 118 may be integrated into the same device as the camera 112 or may be implemented in one or more other devices.

As shown in FIG. 1, the image data frame 114 includes pixel data 120 for various pixels in the image data frame 114. For example, the image data frame 114 includes first pixel data 120a for a first pixel, second pixel data 120b for a second pixel, third pixel data 120c for a third pixel, fourth pixel data 120d for a fourth pixel, and nth pixel data 120n for an nth pixel. In some implementations, the pixel data 120 includes pixel values. For example, the pixel data 120 includes red, green, and blue (RGB) color values for the corresponding pixels.

In some implementations, the image data frame 114 represents a face of the user 110 and encodes a physical facial expression indicating one or more physical facial features. In some implementations, the expression modulation device 106 detects a change in one or more of the physical facial features that indicate the physical facial expression. For example, the expression modulation device 106 may detect that the user 110 is exhibiting a fearful physical facial expression, a happy physical facial expression, an excited physical facial expression, an angry physical facial expression, a sad physical facial expression, a surprised physical facial expression, a disgusted physical facial expression, and/or another physical facial expression.

The physical expression data 108 may include data in addition to or instead of the image data frame 114. In some implementations, the sensor 102 includes a tactile sensor 113 that captures tactile sensor data 115 relating to the face of the user 110. In some implementations, the tactile sensor 113 includes one or more contact points (e.g., sensor pads) that touch the face of the user 110. In some implementations, the tactile sensor 113 detects movement of facial muscles, and the tactile sensor data 115 encodes the movement.

In some implementations, the sensor 102 includes a depth sensor 117 that captures depth data and generates a mesh map 119 that includes depth information relating to the face of the user 110. In some implementations, the mesh map 119 indicates the physical facial features of the user 110.

In some implementations, physical expression data 108 includes physical facial feature values 121 that characterize the physical facial features of the user 110. For example, physical facial feature values 121 may include a width of a smile, a height of a physical ridge, a depth of a physical indentation, a shape of an eyebrow, a diameter of a pupil, an amount of perspiration, and/or a skin color. In some implementations, the physical facial feature values 121 are generated (e.g., derived) from the image data frame 114, the tactile sensor data 115, and/or the mesh map 119.

In various implementations, the expression modulation device 106 generates virtual expression data 122 based on the physical expression data 108. In some implementations, the expression modulation device 106 modifies the physical expression data 108 in order to generate the virtual expression data 122 for the user 110. In some implementations, the expression modulation device 106 modifies the image data frame 114 to generate a modified image data frame 124 in order to modify a physical facial expression of the user 110. In some implementations, the expression modulation device 106 modifies the physical facial feature values 121 to generate virtual facial feature values 128. For example, the expression modulation device 106 may modify a physical facial feature value representing a physical pupil size to generate a virtual facial feature value representing a virtual pupil size that is larger or smaller than the physical pupil size.

In some implementations, the expression modulation device 106 changes the values of some of the pixels, while leaving the values of other pixels unchanged. In the example of FIG. 1, the modified image data frame 124 includes modified pixel data 126 for some of the pixels. For example, the modified image data frame 124 includes modified pixel data 126a for the first pixel and modified pixel data 126c for the third pixel. As shown in FIG. 1, in some implementations, the modified image data frame 124 also includes unmodified pixel data for some pixels. For example, the modified image data frame 124 includes unmodified second pixel data 120b for the second pixel, unmodified fourth pixel data 120d for the fourth pixel, and unmodified pixel data 120n for the nth pixel.

In various implementations, the client device 104 obtains the virtual expression data 122 including the modified pixel data 126 and/or the virtual facial feature values 128. The client device 104 may render the modified image data frame 124 on a display of the client device 104. In some implementations, the client device 104 renders an image data frame that is consistent with the virtual facial feature values 128. Because the modified image data frame 124 includes modified pixel data 126, in some implementations, some of the pixels displayed at the client device 104 are modified from the image data frame 114. For example, in some implementations, the modified image data frame 124 represents a face of the user 110 and displays a virtual facial expression including one or more virtual facial features corresponding to the one or more physical facial features of the user 110. In some implementations, the pixels representing a virtual facial feature are modified such that the virtual facial feature is modified (e.g., scaled) relative to the corresponding physical facial feature of the user 110. Accordingly, in some implementations, the virtual expression data 122 exhibits a virtual facial expression that represents a modified physical facial expression of the user 110.

In various implementations, the client device 104 includes a mobile computing device (e.g., a smartphone, a tablet, or a laptop), a desktop, a television, and/or an XR device (e.g., a head-mountable device (HMD) such as an XR headset). In some implementations, a head-mountable device (HMD), being worn by a user, presents (e.g., displays) the XR environment according to various implementations. In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the client device 104 can be attached to the head-mountable enclosure. In various implementations, the head-mountable enclosure is shaped to form a receptacle for receiving another device that includes a display (e.g., the client device 104). For example, in some implementations, the client device 104 slides/snaps into or otherwise attaches to the head-mountable enclosure. In some implementations, the display of the device attached to the head-mountable enclosure presents (e.g., displays) the XR environment. In various implementations, examples of the client device 104 include smartphones, tablets, media players, laptops, etc.

In some implementations, an HMD includes an enclosure in which a mobile computing device may be inserted or installed. In some implementations, an HMD includes an integrated display that displays content received via a wired or wireless interface.

In various implementations, the expression modulation device 106 allows the sensor 102 to provide the virtual expression data 122 to the client device 104 while preventing the client device 104 from accessing certain information represented by the physical expression data 108, such as the user's physical facial expression. As such, the expression modulation device 106 provides more control over what a user of the client device 104 is able to view. In various implementations, the expression modulation device 106 reduces the need to block transmittal of the physical expression data 108 altogether because the expression modulation device 106 allows certain physical expressions to be modified, thereby enhancing user experience. In various implementations, the expression modulation device 106 thus enhances a user's privacy by modifying or otherwise limiting the transmission of information from the user's environment to another, at the user's control. In some implementations, the user of the client device 104 is able to opt in to, e.g., provide informed consent to, the display of modified physical facial expressions. In some implementations, the expression modulation device 106 notifies the user of the client device 104 that the virtual facial expression is or may be a modified physical facial expression.

Figure 2A:
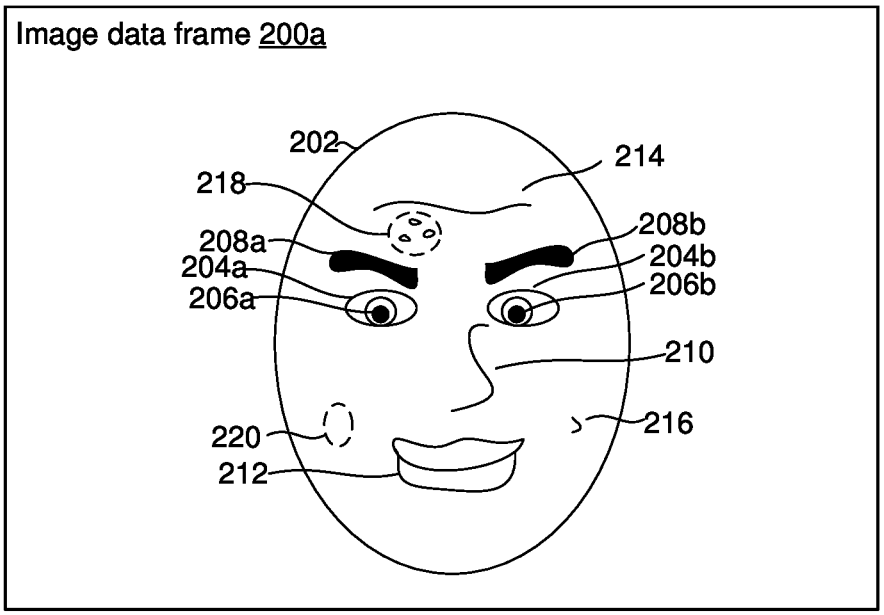
FIGS. 2A-2M are diagrams of example image data frames in accordance with some implementations.

FIG. 2A illustrates an example image data frame 200a. In some implementations, the expression modulation device 106 obtains the image data frame 200a from the expression data source 101 (e.g., the sensor 102). For example, in some implementations, the camera 112 captures the image data frame 200a and provides the image data frame 200a to the expression modulation device 106. In some implementations, the image data frame 200a is part of a video feed. For example, in some implementations, the image data frame 200a is a video frame. In some implementations, the image data frame 200a is a still image frame.

The image data frame 200a includes pixels that represent a face 202. In the example of FIG. 2A, the face 202 includes a number of facial features that, individually or in combination, form a physical facial expression. The face 202 includes two eyes 204a, 204b that have respective pupils 206a, 206b. In the example of FIG. 2A, the face 202 includes two eyebrows 208a, 208b. The face 202 also includes a nose 210 and a mouth 212. In some implementations, the expression modulation device 106 detects the shape and/or relative positioning of these and other facial features to determine a user's physical facial expression.

In some implementations, the expression modulation device 106 detects other features to determine a user's physical facial expression. For example, a physical ridge 214 (e.g., a wrinkle) may appear on the user's forehead during the manifestation of certain physical facial expressions. As another example, a physical indentation 216 (e.g., a dimple) may appear on the user's cheek or other area of the face 202 during the manifestation of certain physical facial expressions. As another example, drops of perspiration 218 may appear on the face 202 during the manifestation of certain physical facial expressions. As another example, during the manifestation of certain physical facial expressions, a skin color 220 of the face 202 may change, e.g., lighten, darken, and/or redden.

Figure 2B:
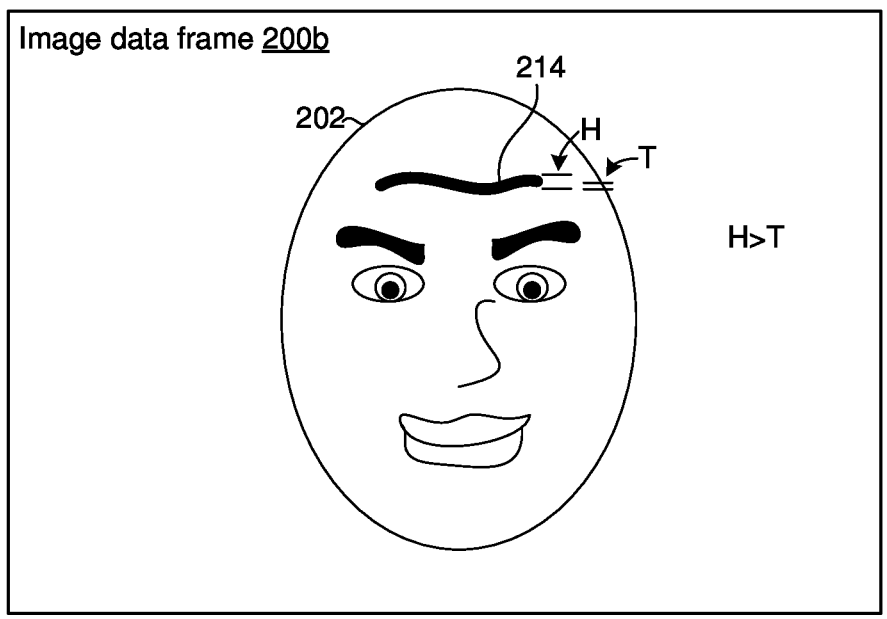

In some implementations, the expression modulation device 106 detects, via the sensor 102, a change in the physical facial features of the user (e.g., of the face 202) indicating the user's physical facial expression. FIG. 2B illustrates an example image data frame 200b including a change in physical facial features. In some implementations, the expression modulation device 106 detects that the physical facial expression indicated by the image data frame 200b breaches a criterion, e.g., that the physical ridge 214 has appeared on the user's forehead and/or that the physical ridge 214 has a height H that breaches (e.g., exceeds or falls under) a threshold height T.

Figure 2C:
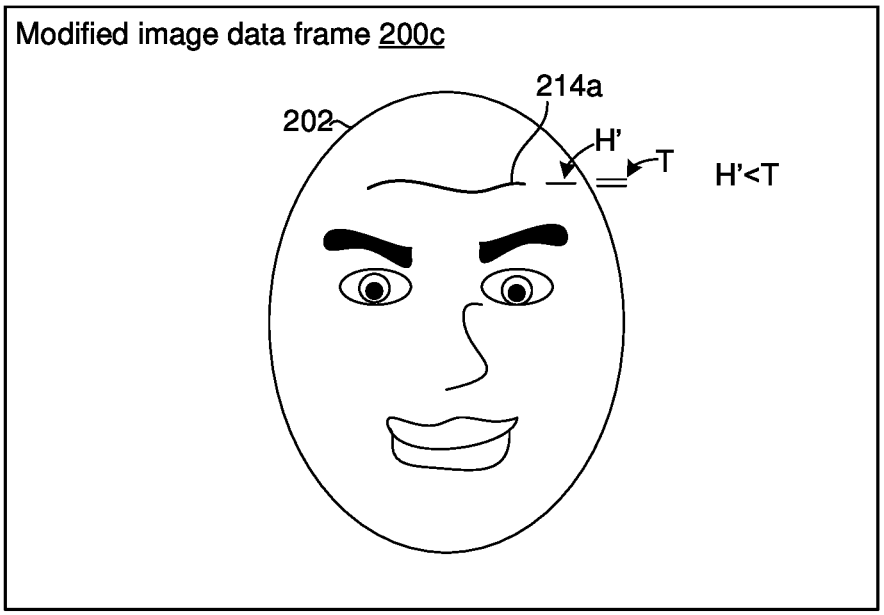

FIG. 2C illustrates an example modified image data frame 200c that the expression modulation device 106 may synthesize. The modified image data frame 200c includes pixels that represent a virtual facial expression. In some implementations, the expression modulation device 106 modifies the physical facial expression of the user by scaling the height of the physical ridge 214 by a scaling factor and modifying the pixels of the image data frame 200b accordingly when generating the modified image data frame 200c. In some implementations, the expression modulation device 106 modifies the physical facial expression of the user by modifying the pixels of the image data frame 200b to remove the physical ridge 214. In some implementations, the expression modulation device 106 modifies the pixels of the image data frame 200b such that the virtual facial expression indicated by the modified image data frame 200c satisfies a criterion, e.g., that a height H' of a virtual ridge 214a does not breach the threshold height T, as shown in FIG. 2C. In some implementations, the expression modulation device 106 may modify a physical facial feature value representing a physical ridge height to generate a virtual facial feature value representing a virtual ridge height that is larger or smaller than the threshold ridge height, as specified by the criterion.

Figure 2D:
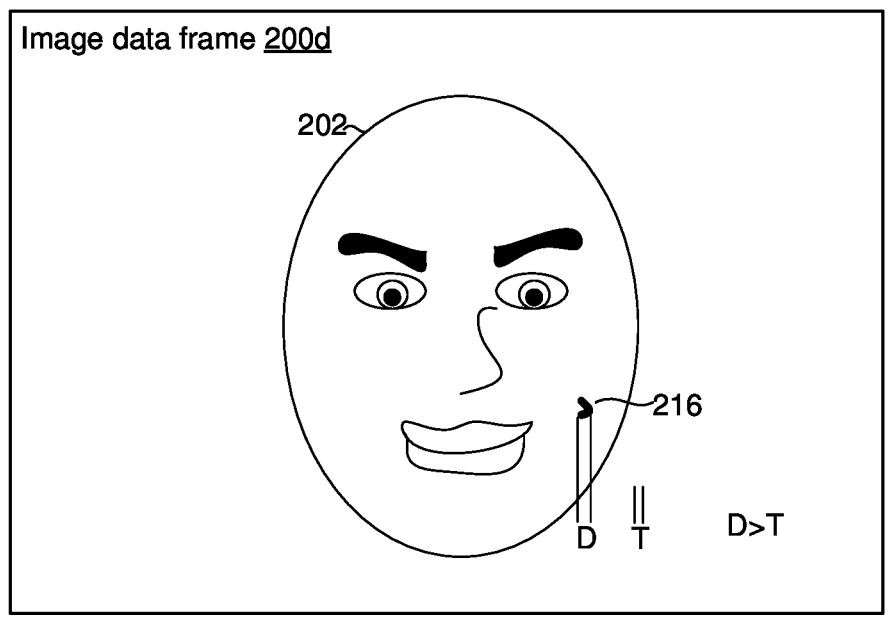

FIG. 2D illustrates another example image data frame 200d including a change in physical facial features. In some implementations, the expression modulation device 106 detects that the physical facial expression indicated by the image data frame 200d breaches a criterion, e.g., that the physical indentation 216 has appeared on the user's cheek and/or that the physical indentation 216 has a depth D that breaches (e.g., exceeds or falls under) a threshold depth T.

Figure 2E:
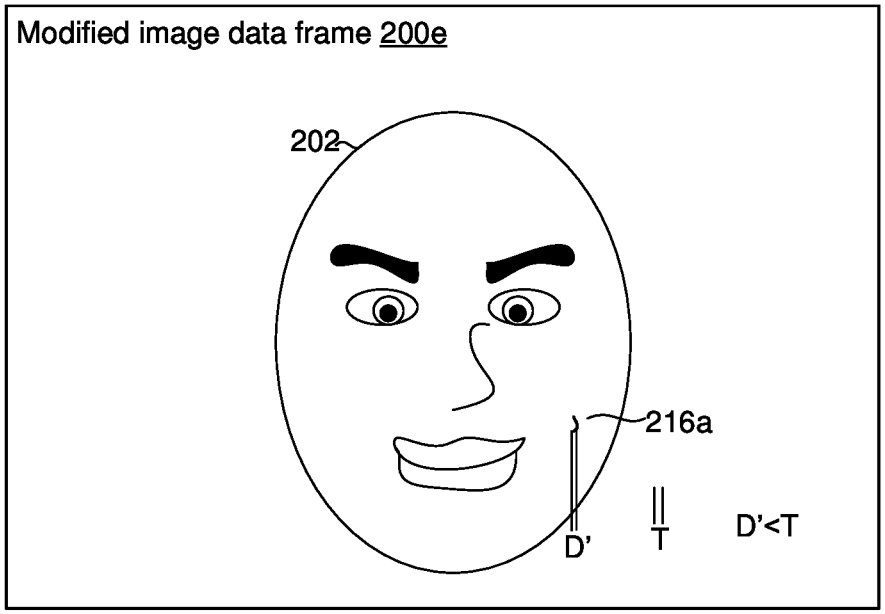

FIG. 2E illustrates an example modified image data frame 200e that the expression modulation device 106 may synthesize. The modified image data frame 200e includes pixels that represent a virtual facial expression. In some implementations, the expression modulation device 106 modifies the physical facial expression of the user by scaling the height of the indentation by a scaling factor and modifying the pixels of the image data frame 200d accordingly. In some implementations, the expression modulation device 106 modifies the physical facial expression of the user by modifying the pixels of the image data frame 200d to remove the physical indentation 216. In some implementations, the expression modulation device 106 modifies the pixels of the image data frame 200d such that the virtual facial expression indicated by the modified image data frame 200e satisfies a criterion, e.g., that a depth D' of a virtual indentation 216a does not breach the threshold depth T, as shown in FIG. 2E. In some implementations, the expression modulation device 106 may modify a physical facial feature value representing a physical indentation depth to generate a virtual facial feature value representing a virtual indentation depth that is larger or smaller than the threshold indentation depth, as specified by the criterion.

Figure 2F:
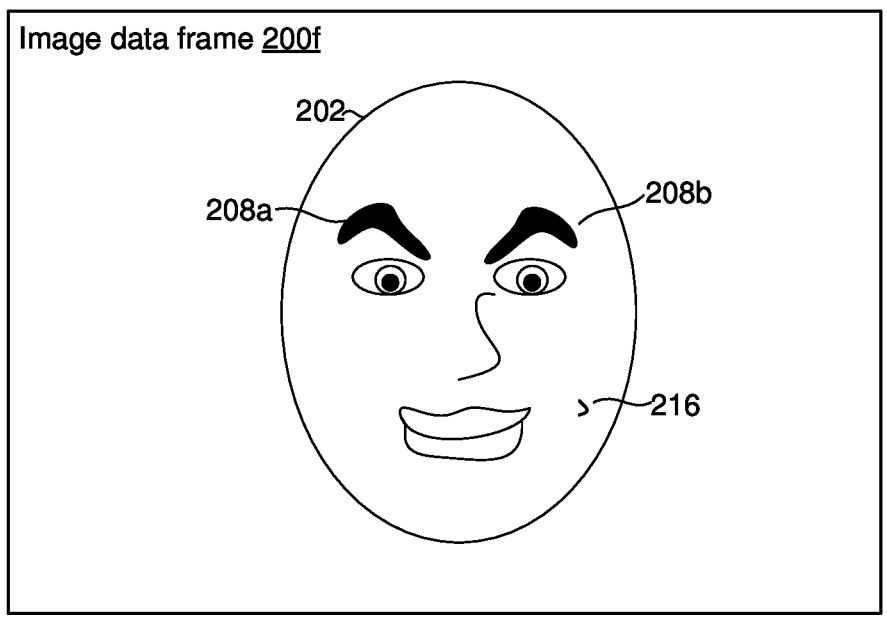

FIG. 2F illustrates another example image data frame 200f including a change in physical facial features. In some implementations, the expression modulation device 106 detects that the physical facial expression indicated by the image data frame 200d breaches a criterion, e.g., that one or both of the user's eyebrows 208a, 208b has changed shape (e.g., arched) relative to the image data frame 200a and/or that the amount of change breaches (e.g., exceeds or falls under) a threshold amount of change T.

Figure 2G:
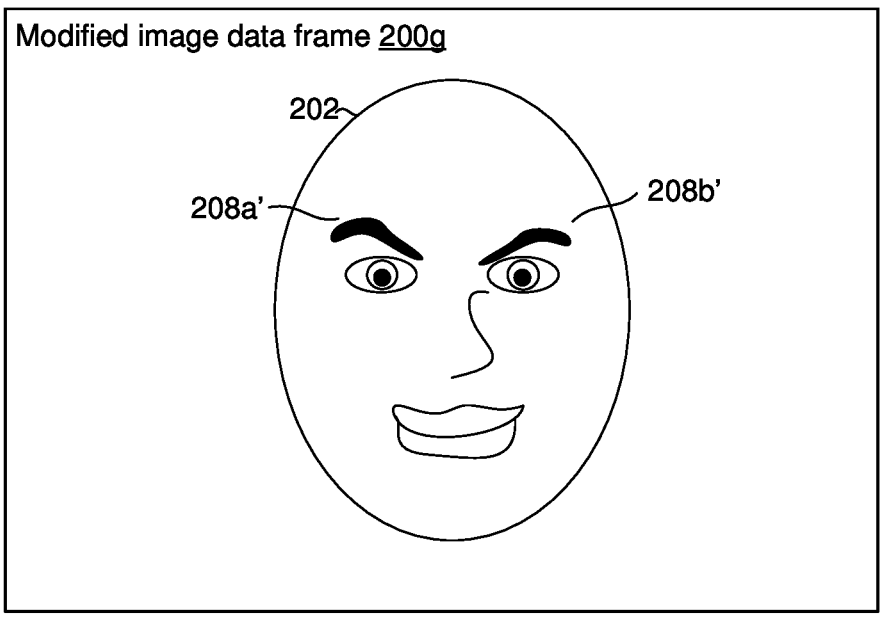

FIG. 2G illustrates an example modified image data frame 200g that the expression modulation device 106 may synthesize. The image data frame 200g includes pixels that represent a virtual facial expression. In some implementations, the expression modulation device 106 modifies the physical facial expression of the user by scaling the size of the eyebrows 208a, 208b by a scaling factor and modifying the pixels of the image data frame 200f accordingly. In some implementations, the expression modulation device 106 modifies the physical facial expression of the user by modifying the pixels of the image data frame 200f to replace the eyebrows 208a, 208b with another set of eyebrows 208a', 208b', such as the eyebrows from the image data frame 200a. In some implementations, the expression modulation device 106 modifies the pixels of the image data frame 200f such that the virtual facial expression indicated by the modified image data frame 200g satisfies a criterion, e.g., that the amount of change in eyebrow shape does not breach the threshold amount of change T. In some implementations, the expression modulation device 106 may modify a physical facial feature value representing an eyebrow size or shape to generate a virtual facial feature value that satisfies the criterion (e.g., the eyebrows 208a', 208b' satisfy the criterion).

Figure 2H:
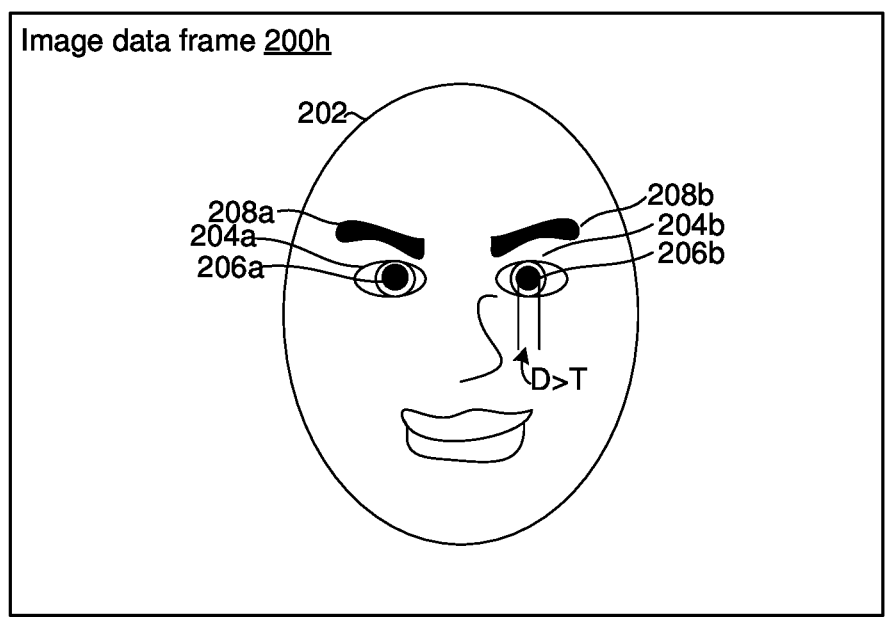

FIG. 2H illustrates another example image data frame 200h including a change in physical facial features. In some implementations, the expression modulation device 106 detects that the physical facial expression indicated by the image data frame 200h breaches a criterion, e.g., that one or both of the pupils 206a, 206b in the user's eyes 204a, 204b has changed size (e.g., dilated) relative to the image data frame 200a and/or that an amount of change D breaches (e.g., exceeds or falls under) a threshold amount of change T.

Figure 2I:
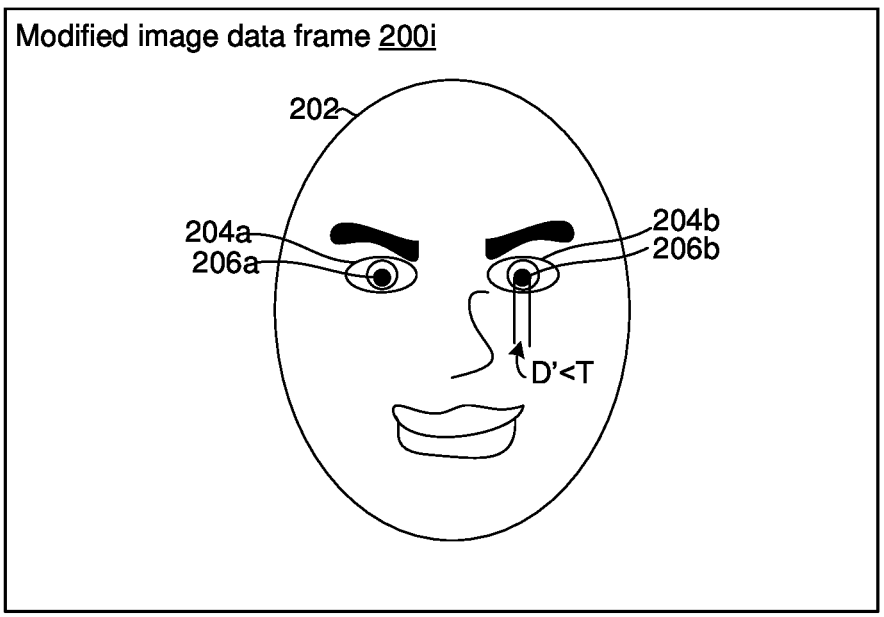

FIG. 2I illustrates an example modified image data frame 200i that the expression modulation device 106 may synthesize. The image data frame 200i includes pixels that represent a virtual facial expression. In some implementations, the expression modulation device 106 modifies the physical facial expression of the user by scaling the size of the pupils 206a, 206b by a scaling factor and modifying the pixels of the image data frame 200i accordingly. In some implementations, the expression modulation device 106 modifies the pixels of the image data frame 200h such that the virtual facial expression indicated by the modified image data frame 200i satisfies a criterion, e.g., that the amount of change D' in pupil size does not breach the threshold amount of change T. In some implementations, the expression modulation device 106 may modify a physical facial feature value representing a physical pupil size to generate a virtual facial feature value representing a virtual pupil size that is larger or smaller than the threshold pupil size, as specified by the criterion.

Figure 2J:
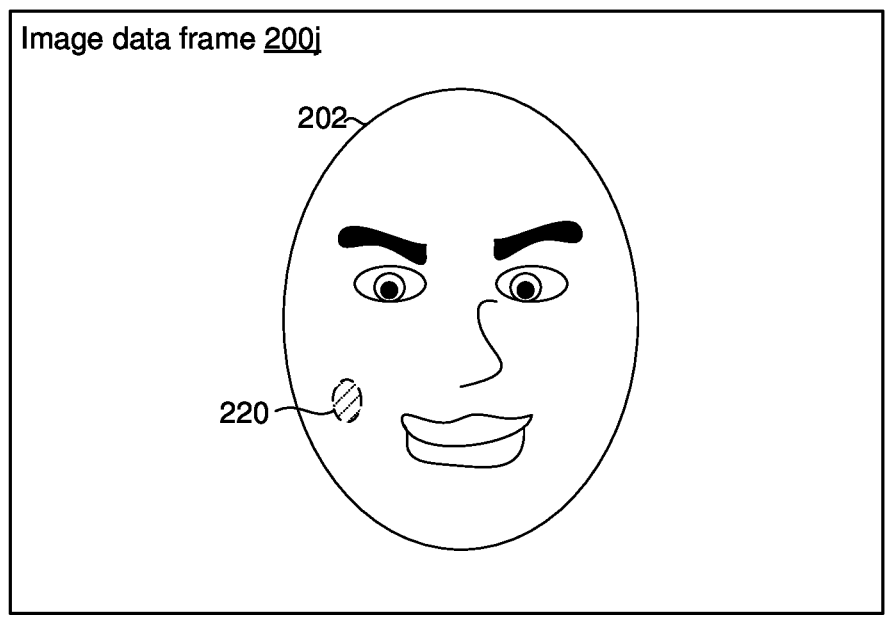

FIG. 2J illustrates another example image data frame 200j including a change in physical facial features. In some implementations, the expression modulation device 106 detects that the physical facial expression indicated by the image data frame 200h breaches a criterion, e.g., that a skin color 220 has changed relative to the image data frame 200a, as indicated by hatching on FIG. 2J, and/or that an amount of change breaches (e.g., exceeds or falls under) a threshold amount of change.

Figure 2K:
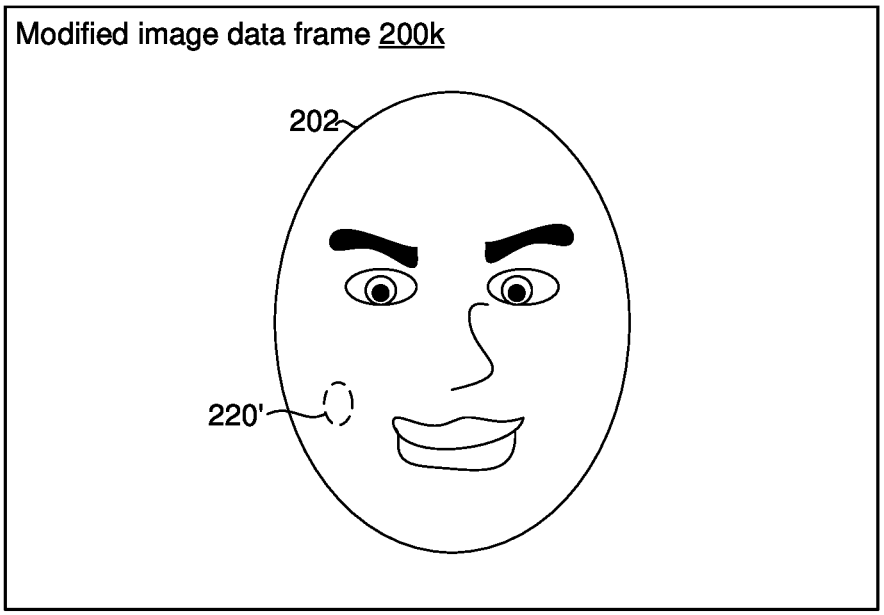

FIG. 2K illustrates an example modified image data frame 200k that the expression modulation device 106 may synthesize. The image data frame 200k includes pixels that represent a virtual facial expression. In some implementations, the expression modulation device 106 modifies the physical facial expression of the user by scaling a change in the skin color 220 by a scaling factor and modifying the pixels of the image data frame 200j accordingly, e.g., by changing RGB values of the appropriate pixels. In some implementations, the expression modulation device 106 modifies the pixels of the image data frame 200j such that the virtual facial expression indicated by the modified image data frame 200k satisfies a criterion, e.g., that the amount of change in skin color 220' does not breach the threshold amount of change. In some implementations, the expression modulation device 106 may modify a physical facial feature value representing a skin color to generate a virtual facial feature value representing a skin color that satisfies the criterion.

Figure 2L:
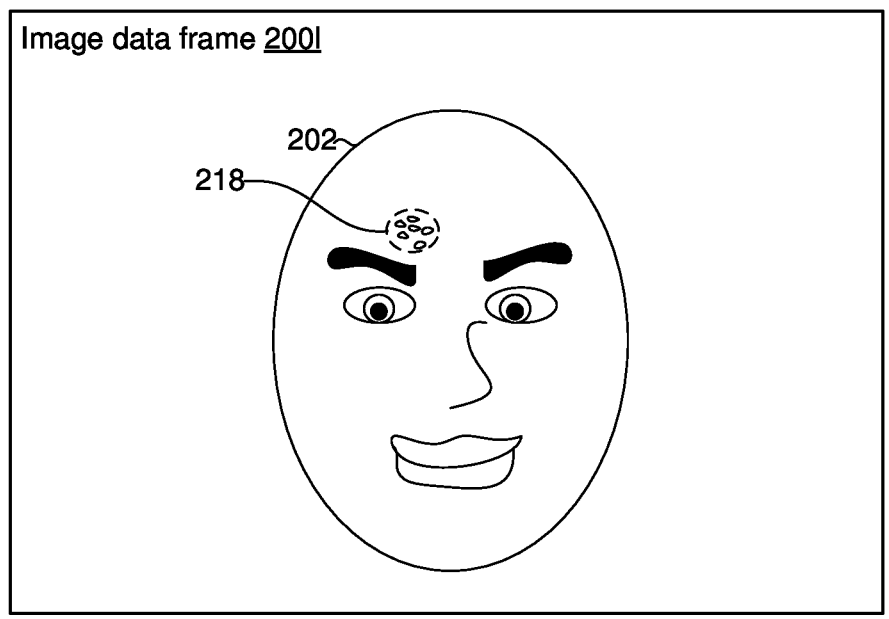

FIG. 2L illustrates another example image data frame 200l including a change in physical facial features. In some implementations, the expression modulation device 106 detects that the physical facial expression indicated by the image data frame 200h breaches a criterion, e.g., that an amount of perspiration 218 has changed relative to the image data frame 200a, and/or that the amount of perspiration 218 breaches (e.g., exceeds or falls under) a threshold amount of perspiration.

Figure 2M:
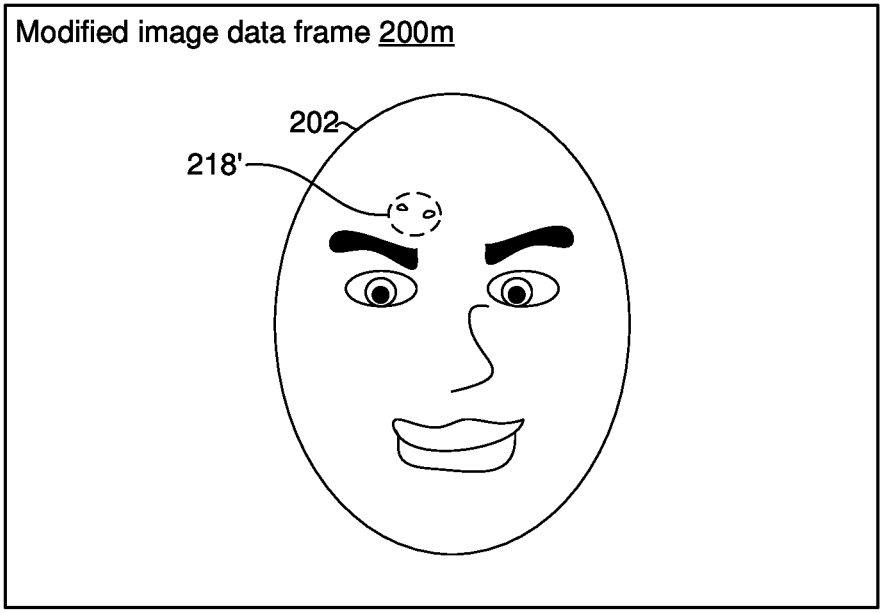

FIG. 2M illustrates an example modified image data frame 200m that the expression modulation device 106 may synthesize. The image data frame 200m includes pixels that represent a virtual facial expression. In some implementations, the expression modulation device 106 modifies the physical facial expression of the user by scaling an amount of perspiration 218 by a scaling factor and modifying the pixels of the image data frame 200l accordingly, e.g., by changing RGB values of the appropriate pixels. In some implementations, the expression modulation device 106 modifies the pixels of the image data frame 200l such that the virtual facial expression indicated by the modified image data frame 200m satisfies a criterion, e.g., that an amount of perspiration 218' does not breach the threshold amount of perspiration. In some implementations, the expression modulation device 106 may modify a physical facial feature value representing the amount of perspiration 218 to generate a virtual facial feature value representing the amount of perspiration 218' that satisfies the criterion.

Figure 3:
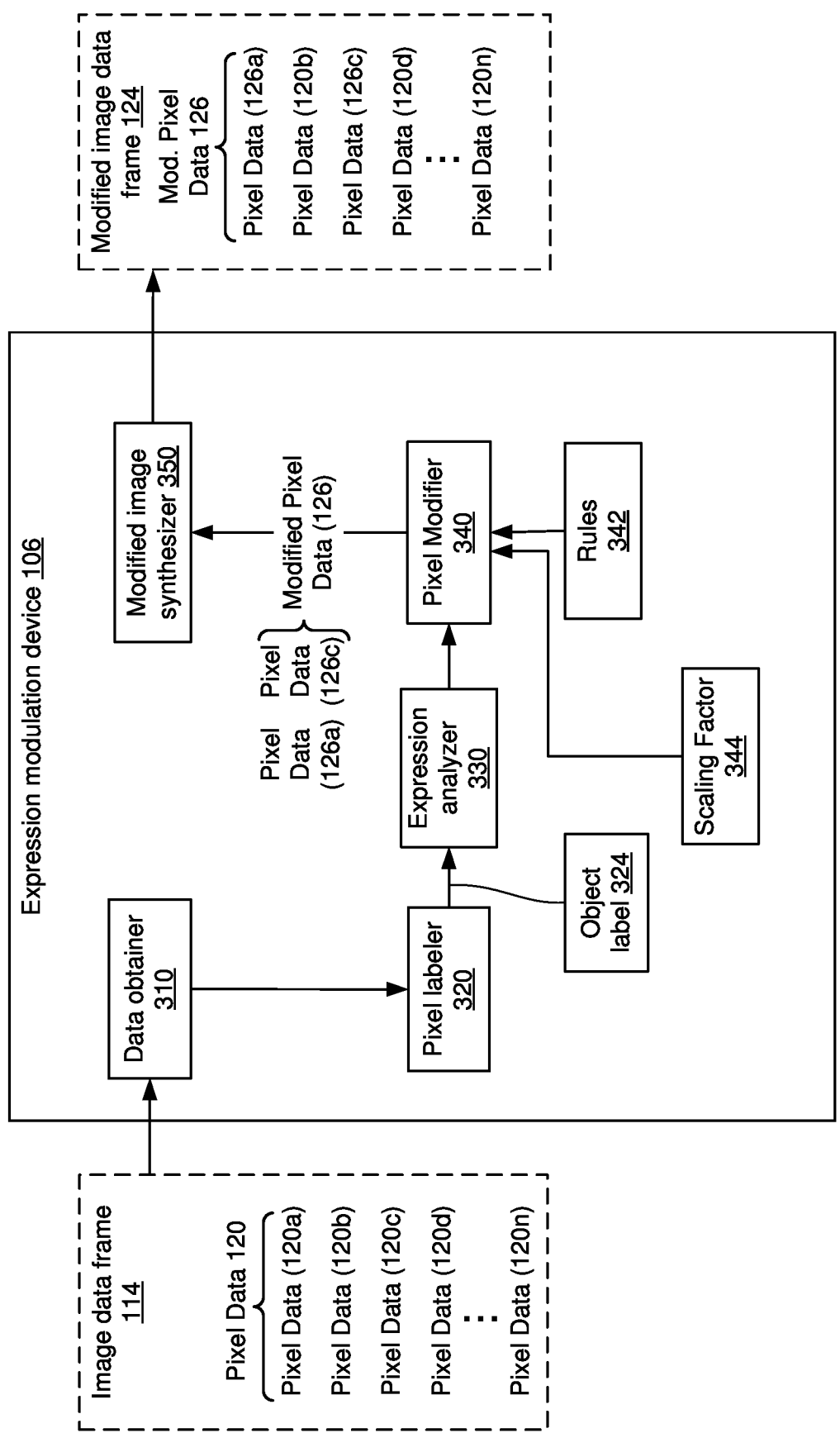
FIG. 3 is a block diagram of an example expression modulation device in accordance with some implementations.

FIG. 3 illustrates the expression modulation device 106 in accordance with some implementations. In some implementations, the expression modulation device 106 includes a data obtainer 310, a pixel labeler 320, an expression analyzer 330, a pixel modifier 340, and a modified image synthesizer 350. In various implementations, the data obtainer 310 obtains image data frames. For example, in some implementations, the data obtainer 310 obtains the image data frame 114 of FIG. 1. In some implementations, the data obtainer 310 receives the image data frame 114, for example, from the sensor 102 shown in FIG. 1. In some implementations, the data obtainer 310 retrieves the image data frame 114, for example, from the sensor 102 (e.g., the camera 112). In some implementations, the data obtainer 310 obtains a video feed, e.g., from the camera 112 or the XR system 118, and extracts image data frames from the video feed.

In some implementations, the pixel labeler 320 generates a respective object label 324 for each of the pixels in the image data frame 114. In some implementations, each object label 324 indicates an object type, e.g., a facial feature, that the corresponding pixel represents.

In some implementations, the expression analyzer 330 receives the pixel data 120 and the associated object labels 324 and detects physical facial features making up the user's physical facial expression. The expression analyzer 330 determines the shape, size, relative positioning, and/or other characteristics of the physical facial features and determines a physical facial expression expressed by the physical facial features.

In various implementations, the pixel modifier 340 modifies corresponding pixel data of pixels in order to modify the user's physical facial expression. For example, the pixel modifier 340 may receive rules 342 and modify pixel data of pixels according to the received rules 342. The rules 342 may specify a criterion, e.g., a modification criterion, and may specify a modification operation to perform on a virtual facial feature of the XR face on a condition that the criterion is breached. Some example rules are disclosed herein in connection with FIGS. 2A-2M.

For example, in some embodiments, a rule may specify that if the height of a physical ridge appearing on a user's face breaches (e.g., exceeds or falls below) a threshold height, the height of the corresponding ridge appearing on the XR face should be scaled by a scaling factor 344. The scaling factor may be selected to reduce the size of the ridge or to enlarge the ridge, depending on whether the rule is intended to attenuate or intensify the virtual facial expression on the XR representation of the user relative to the user's physical facial expression.

In some embodiments, the rule may specify that the modification operation is performed on the virtual facial feature of the XR face so that the XR face indicates a virtual facial expression that no longer breaches the criterion. For example, if the modification operation is triggered by the height of a physical ridge breaching a threshold height, the modification operation may be performed to generate an XR face having a virtual ridge whose height does not breach the threshold height.

In various implementations, the pixel modifier 340 generates modified pixel data 126. For example, the pixel modifier 340 generates modified pixel data 126a for the first pixel in the image data frame 114 and modified pixel data 126c for the third pixel in the image data frame 114. In some implementations, the pixel modifier 340 provides the modified pixel data 126 to the modified image synthesizer 350.

In various implementations, the modified image synthesizer 350 synthesizes the modified image data frame 124 based on the modified pixel data 126. The modified image data frame 124 synthesized by the modified image synthesizer 350 includes the modified pixel data 126 for the pixels that correspond to modified facial features and unmodified pixel data for the pixels that correspond to unmodified facial features. In the example of FIG. 3, the modified image data frame 124 includes the modified pixel data 126 for the first pixel and the third pixel, and unmodified pixel data for the second pixel, the fourth pixel, and the nth pixel. In some implementations, the modified image synthesizer 350 provides the modified image data frame 124 to a rendering and display pipeline. In some implementations, the modified image synthesizer 350 transmits the modified image data frame 124 to another device that displays the modified image data frame 124.

Figure 4C:
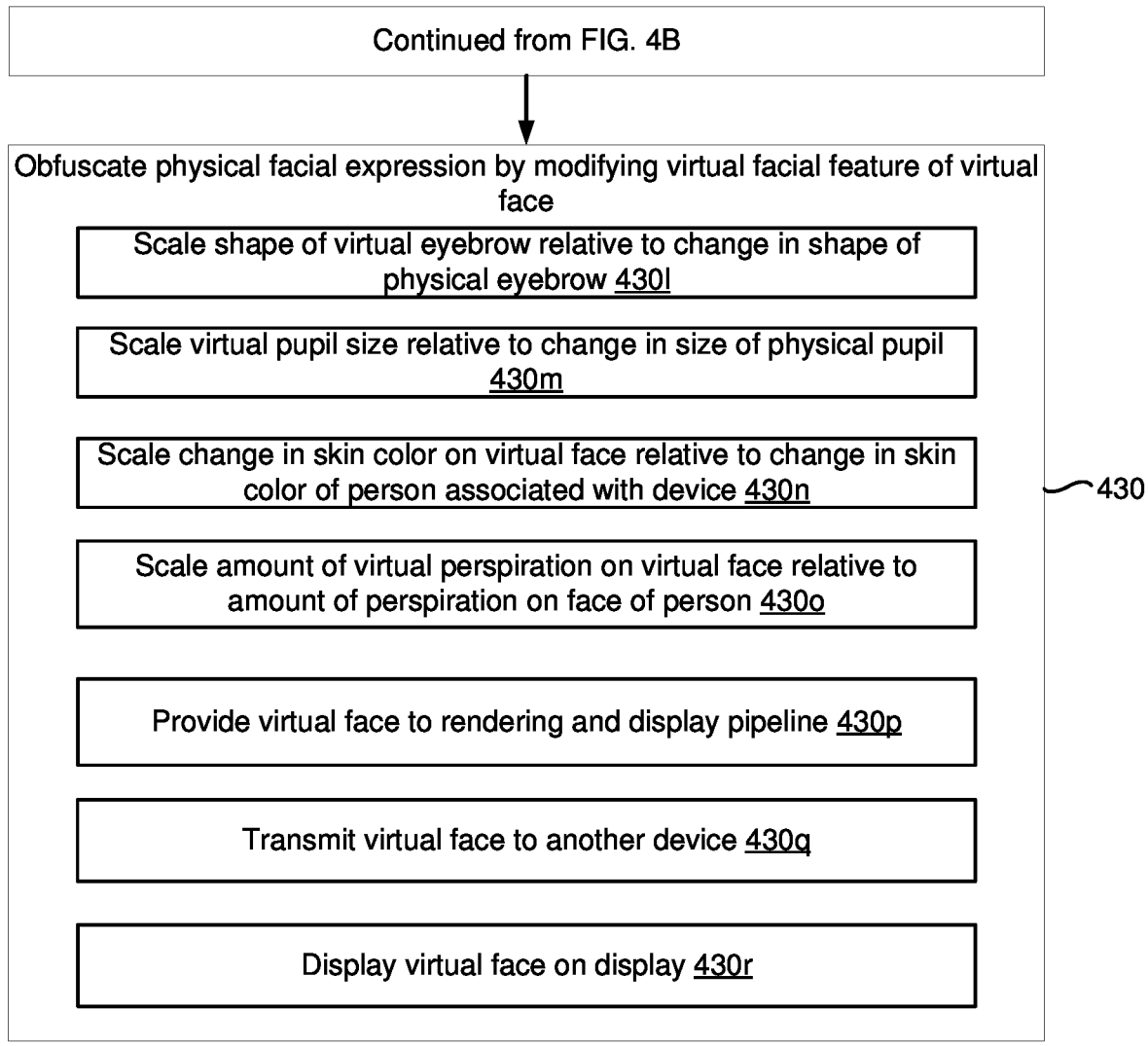

FIGS. 4A-4C are a flowchart representation of a method 400 for modifying a physical facial expression in accordance with some implementations. In various implementations, the method 400 is performed by a device having a display (e.g., the expression modulation device 106 shown in FIGS. 1 and 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes displaying an extended reality (XR) environment including an XR representation of a person, detecting a physical facial feature indicating a physical facial expression, and, upon determining that the physical facial expression breaches a criterion, modifying the physical facial expression by modifying a virtual facial feature of the XR representation of the person.

As represented by block 410, in various implementations, the method 400 includes displaying an XR environment via the display. The XR environment may be, for example, a virtual conference room or meeting space, and may include XR representations of the person associated with the device (e.g., the user 110 of FIG. 1) and/or other persons, such as one or more persons with whom the user 110 is engaged in conversation. The XR representation of the user 110 includes a face with virtual facial features. The virtual facial features correspond to respective physical features of the person associated with the device (e.g., the user 110 shown in FIG. 1).

As represented by block 420, in various implementations, the method 400 includes detecting, via the sensor, a change in a physical facial feature of the person associated with the device and determining whether a criterion (e.g., a modification criterion) is breached. For example, in some implementations, an image data frame is captured by the camera 112 or obtained from the datastore 116 or the XR system 118. In some implementations, the method 400 includes capturing a video feed that includes the image data frame. For example, in some implementations, the image data frame is a video frame that is extracted from a video. The video feed may be captured using the camera 112. In some implementations, the video is a pre-recorded video. Alternatively, in some implementations, the video is a live video (e.g., a livestream).

In some implementations, the image data frame (e.g., the image data frame 114 or the image data frame 200a) includes a plurality of pixels. In some implementations, each pixel is associated with respective pixel data. For example, as shown in FIG. 1, a first pixel of the image data frame 114 is associated with the first pixel data 120a, a second pixel of the image data frame 114 is associated with the second pixel data 120b, and an nth pixel of the image data frame 114 is associated with the nth pixel data 120n.

The pixels are associated with physical facial features of the user 110. In some implementations, the expression modulation device 106 detects physical facial features making up the user's physical facial expression. The expression modulation device 106 determines the shape, size, relative positioning, and/or other characteristics of the physical facial features and determines a physical facial expression expressed by the physical facial features.

As represented by block 420a, in some implementations, the method 400 includes detecting the appearance of a physical ridge (e.g., a wrinkle, as shown in FIG. 2B, potentially indicating anger) or a physical indentation (e.g., a dimple, as shown in FIG. 2D, potentially indicating happiness) on the user's face. In some implementations, the appearance of the physical ridge or the physical indentation breaches the criterion. In some implementations, as represented by block 420b, the expression modulation device 106 compares the height of the physical ridge to a threshold height. If the threshold height is breached, the criterion is breached. In some implementations, the criterion is breached if the height of the physical ridge exceeds the threshold height, e.g., potentially indicating that the user's physical facial expression is showing too much anger. In some implementations, the criterion is breached if the height of the physical ridge is less than the threshold height, e.g., potentially indicating that the user's physical facial expression is showing insufficient anger.

In some implementations, as represented by block 420c, the expression modulation device 106 compares the depth of the physical indentation to a threshold depth. If the threshold depth is breached, the criterion is breached. In some implementations, the criterion is breached if the depth of the physical indentation exceeds the threshold depth, e.g., potentially indicating that the user's physical facial expression is showing too much happiness. In some implementations, the criterion is breached if the depth of the physical indentation is less than the threshold depth, e.g., potentially indicating that the user's physical facial expression is showing insufficient happiness.

As represented by block 420d, in some implementations, the method 400 includes detecting a change in the shape of the eyebrows of the person associated with the device. For example, the expression modulation device 106 may detect that the eyebrows have become arched. In some implementations, the change in shape breaches the first criterion. In some implementations, as represented by block 420e, the expression modulation device 106 compares the amount of change in the shape of the eyebrows to a threshold amount of change. For example, the expression modulation device 106 may determine a degree of similarity between eyebrow shapes at different instants in time. If the threshold amount of change is breached, the criterion is breached. In some implementations, the criterion is breached if the amount of change in the shape of the eyebrows exceeds a threshold amount. In some implementations, the criterion is breached if the amount of change in the shape of the eyebrows is below the threshold amount.

As represented by block 420f, in some implementations, the method 400 includes detecting a change in the size of a pupil of the person associated with the device. For example, the expression modulation device 106 may detect that the user's pupils have dilated, potentially indicating interest, excitement, or fear. In some implementations, the change in pupillary size breaches the first criterion. In some implementations, as represented by block 420g, the expression modulation device compares the change in pupillary size to a threshold amount of change. If the threshold amount of change is breached, the criterion is breached. In some implementations, the criterion is breached if the amount of change in pupillary size exceeds a threshold amount, e.g., potentially indicating that the user's physical facial expression shows too much interest, excitement, or fear. In some implementations, the criterion is breached if the amount of change in pupillary size is below the threshold amount, e.g., potentially indicating that the user's physical facial expression shows insufficient interest, excitement, or fear.

As represented by block 420h, in some implementations, the method 400 includes detecting a change in the skin color of the person associated with the device. For example, the expression modulation device 106 may detect that the user is blushing, potentially signaling embarrassment. In some implementations, the change in skin color breaches the criterion. In some implementations, as represented by block 420i, the expression modulation device compares the change in skin color to a threshold amount of change. If the threshold amount of change is breached, the criterion is breached. In some implementations, the criterion is breached if the amount of change in skin color exceeds a threshold amount, e.g., potentially indicating that the physical facial expression shows too much embarrassment. In some implementations, the criterion is breached if the amount of change in skin color is below the threshold amount, e.g., potentially indicating that the physical facial expression shows insufficient embarrassment.

As represented by block 420*j*, in some implementations, the method 400 includes detecting the presence of perspiration on the face of the person associated with the device, which may be an indicator of, e.g., fear. In some implementations, the existence of perspiration breaches the criterion. In some implementations, as represented by block 420*k*, the expression modulation device compares the amount of perspiration to a threshold amount of perspiration. If the threshold amount of perspiration is breached, the criterion is breached. In some implementations, the criterion is breached if the amount of perspiration exceeds a threshold amount, e.g., potentially indicating the physical facial expression is too fearful. In some implementations, the criterion is breached if the amount of perspiration is below the threshold amount, e.g., potentially indicating the physical facial expression is not fearful enough.

As represented by block 430, in various implementations, the method 400 includes, on a condition that the criterion is breached, modifying the physical facial expression by modifying a virtual facial feature of the XR face so that the XR face indicates a virtual facial expression that satisfies (e.g., no longer breaches) the criterion.

As represented by block 430*a*, in some implementations, the method 400 includes determining a scaling factor. The scaling factor may be greater than one, for example, to amplify physical facial features. In some implementations, the scaling factor may be less than one, for example, to dampen or attenuate physical facial features.

In some implementations, as represented by block 430*b*, the method 400 includes modifying a virtual facial feature based on the scaling factor and the detected change in the physical facial feature. For example, if, at block 420*a*, the expression modulation device 106 detected the appearance of a physical ridge, the virtual ridge would be modified based on the scaling factor. In some implementations, if the scaling factor is greater than one, the appearance of the virtual ridge on the face of the XR representation is amplified, such that the appearance of anger is intensified. In some implementations, if the scaling factor is less than one, the appearance of the virtual ridge on the face of the XR representation is dampened, such that the appearance of anger is attenuated. Accordingly, as represented by block 430*c*, in some implementations, the virtual facial expression on the face of the XR representation is a scaled version of the physical facial expression on the face of the person associated with the device.

In some implementations, as represented by block 430*d*, the method 400 includes modifying the virtual facial feature of the XR face based on an identity associated with an XR representation of a person in the XR environment. For example, in addition to the person associated with the device, the XR environment may include representations of one or more other persons. In some cases, other persons may be known to the person associated with the device. In other cases, other persons may be unknown to the person associated with the device. A user may wish to employ different methods for modifying physical facial expressions depending on whether the person with whom the user is interacting is known to the user. Accordingly, in some implementations, as represented by block 430*e*, the virtual facial feature is amplified (e.g., the scaling factor is greater than one) if the identity associated with an XR representation of a person in the XR environment is in a contact database of the device. In some implementations, as represented by block 430*f*, the virtual facial feature is dampened (e.g., the scaling factor is less than one) if the identity associated with the XR representation of the person in the XR environment is not in the contact database of the device.

In some implementations, the user may interact with multiple persons in an XR environment. These persons may include a mixture of persons known and unknown to the user. In some implementations, as represented by block 430*g*, the method 400 includes modifying the virtual facial feature based on scaling factors for multiple identities associated with XR representations of multiple persons in the XR environment. For example, scaling factors greater than one may be selected for identities appearing in a contact database of the device. Scaling factors less than one may be selected for identities not appearing in the contact database of the device. In some implementations, the magnitude of the scaling factor is selected based on a classification of the contact, e.g., whether the identity is designated, as a "favorite" or "acquaintance" or "professional" contact.

In some implementations, as represented by block 430*h*, the method 400 includes performing a random or pseudorandom modification to the virtual facial feature of the XR face. For example, in some implementations, the scaling factor is selected by random or pseudorandom number generation. In some implementations, the virtual facial feature to be modified is selected randomly or pseudorandomly. As represented by block 430*i*, in some implementations, random or pseudorandom modification to a virtual facial feature is performed if the XR environment corresponds to a game, e.g., poker.

As disclosed herein in connection with FIGS. 2A-2M, a variety of modifications to virtual facial features can be performed to modify the user's physical facial expression. For example, in some implementations, the height of a virtual ridge appearing on the XR representation of the user's face is scaled relative to the height of the physical ridge appearing on the user's physical face, as represented by block 430*j*. This may be done to make the user appear more or less angry, for example, as shown in FIG. 2C. In some implementations, the scaling factor is selected such that the virtual facial expression indicated by the XR face satisfies the criterion.

In some implementations, the depth of a virtual indentation appearing on the XR representation of the user's face is scaled relative to the depth of the physical indentation appearing on the user's physical face, as represented by block 430*k*. This modification may be performed to make the XR face look more or less happy than the user's physical facial expression, as shown in FIG. 2E. In some implementations, the scaling factor is selected such that the virtual facial expression indicated by the XR face satisfies the criterion.

In some implementations, the shape of one or both virtual eyebrows may be scaled or modified relative to a change in shape of the physical eyebrows of the person associated with the device, as represented by block 430*l*. This modification may be performed to make the XR face look more or less excited than the user's physical facial expression, as shown in FIG. 2G, for example. In some implementations, the scaling factor is selected such that the virtual facial expression indicated by the XR face satisfies the criterion.

In some implementations, the size of one or both virtual pupils may be scaled relative to the size of the physical pupils of the person associated with the device, as represented by block 430*m*. This modification may be performed to make the XR face look more or less interested, excited, or fearful than the user's physical facial expression, as shown in FIG. 2I, for example. In some implementations, the scaling factor is selected such that the virtual facial expression indicated by the XR face satisfies the criterion.

In some implementations, the change in skin color of the XR face may be scaled relative to the change in physical skin color (e.g., blushing) of the person associated with the device, as represented by block 430n. This modification may be performed to make the XR face look more or less embarrassed than the user's physical facial expression, as shown in FIG. 2K, for example. In some implementations, the scaling factor is selected such that the virtual facial expression indicated by the XR face satisfies the criterion.

In some implementations, the amount of virtual perspiration on the XR face may be scaled relative to the amount of perspiration appearing on the face of the person associated with the device, as represented by block 430o. This modification may be performed to make the XR face look more or less fearful than the user's physical facial expression, as shown in FIG. 2M, for example. In some implementations, the scaling factor is selected such that the virtual facial expression indicated by the XR face satisfies the criterion.

As represented by block 430p, in some implementations, the method 400 includes providing the XR face (e.g., a modified image data frame representing the XR face, and/or the virtual facial feature values 128 shown in FIG. 1) to a rendering and display pipeline. For example, the expression modulation device 106 (e.g., the modified image synthesizer 350) provides the modified image data frame 124 to a rendering and display pipeline. In some implementations, as represented by block 430q, the method 400 includes transmitting the XR face (e.g., the modified image data frame 124 and/or the virtual facial feature values 128 shown in FIG. 1) to another device. For example, as shown in FIG. 1, the expression modulation device 106 transmits the modified image data frame 124 to the client device 104. In some implementations, as represented by block 430r, the method 400 includes displaying the first modified image data frame on a display in communication with the device. For example, the client device 104 shown in FIG. 1 displays the modified image data frame 124 on a display of the client device 104.

In various implementations, synthesizing the modified image data frame reduces the need to turn off expression mimicking in an XR environment. As discussed herein, being able to transmit and/or receive image data frames tends to provide an enhanced user experience.

Figure 5:
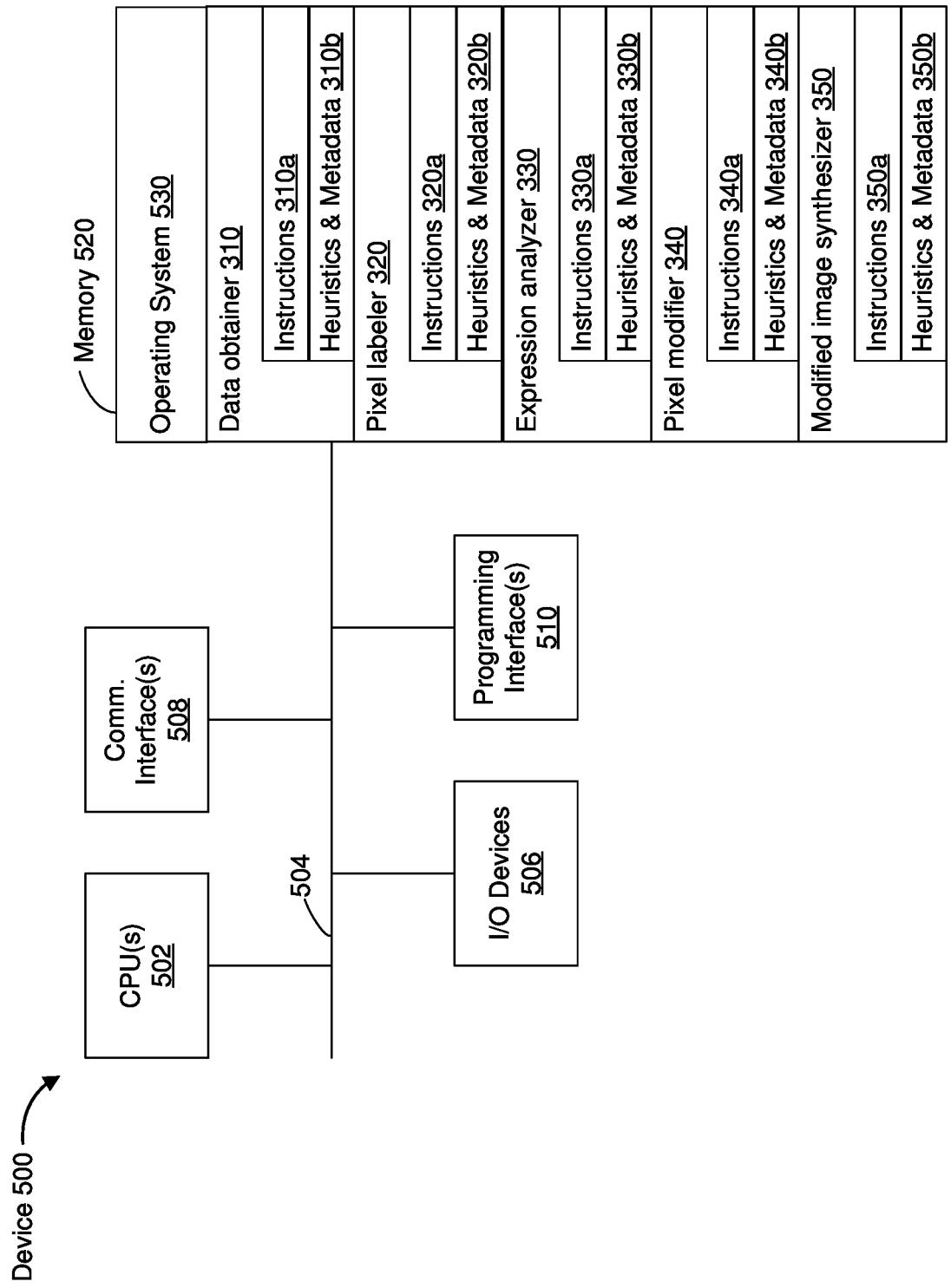
FIG. 5 is a block diagram of a device that modifies a physical facial expression in accordance with some implementations.

FIG. 5 is a block diagram of a device 500 (e.g., the expression modulation device 106 shown in FIGS. 1 and 3) that modifies physical facial expressions by modifying a virtual facial feature in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 500 includes one or more processing units 502 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 506, one or more communication interfaces 508 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a keyboard, a mouse, a touchpad, a joystick, one or more microphones, one or more speakers, one or more image sensors (e.g., one or more cameras, for example, a front-facing camera), one or more displays (e.g., one or more XR displays), and/or the like.

The memory 520 may include high-speed random-access memory, such as dynamic random-access memory (DRAM), static random-access memory (SRAM), double-data-rate random-access memory (DDR RAM), or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530, the data obtainer 310, the pixel labeler 320, the expression analyzer 330, the pixel modifier 340, and the modified image synthesizer 350.

The operating system 530 includes procedures for handling various basic system services and for performing hardware dependent tasks.

As described herein, in various implementations, the data obtainer 310 obtains (e.g., receives or retrieves) physical expression data including image data frames (e.g., the physical expression data 108 including the image data frame 114 shown in FIGS. 1 and 3). To that end, the data obtainer 310 includes instructions 310a and heuristics and metadata 310b. As described herein, in various implementations, the pixel labeler 320 generates object labels for pixels in an image data frame (e.g., the object labels 324 shown in FIG. 3). To that end, the pixel labeler 320 includes instructions 320a and heuristics and metadata 320b. As described herein, in various implementations, the expression analyzer 330 detects physical facial features making up the user's physical facial expression and, based on those physical facial features, determines the physical facial expression. In some implementations, the expression analyzer 330 determines whether the physical facial expression breaches a criterion. To that end, the expression analyzer includes instructions 330a and heuristics and metadata 330b.

As described herein, in various implementations, the pixel modifier 340 modifies one or more of the pixels in the image data frame in order to modify a physical facial expression (e.g., the pixel modifier 340 generates the modified pixel data 126 shown in FIGS. 1 and 3). To that end, the pixel modifier 340 includes instructions 330a and instructions and heuristics 340b. As described herein, in various implementations, the modified image synthesizer 350 synthesizes a modified image data frame that includes modified pixel data for pixels corresponding to the first object label and unmodified pixel data for pixels that do not correspond to the first object label (e.g., the modified image data frame 124 includes modified pixel data 126 for the first and third pixels, and unmodified pixel data 120*b* and 120*d* for the second and fourth pixels). To that end, the modified image synthesizer 350 includes instructions 350*a* and instructions and heuristics 350*b*.

Although the data obtainer 310, the pixel labeler 320, the expression analyzer 330, the pixel modifier 340, and the modified image synthesizer 350 are shown as residing on a single device (e.g., the expression modulation device 106), it should be understood that in other implementations, any combination of the data obtainer 310, the pixel labeler 320, the expression analyzer 330, the pixel modifier 340, and the modified image synthesizer 350 may be located in separate computing devices.

Moreover, FIG. 5 is intended more as functional description of the various features which be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a sensor, a display, a non-transitory memory, and one or more processors coupled with the sensor, the display, and the non-transitory memory:
        displaying, via the display, an environment that includes a representation of a person associated with the device, wherein the representation includes a virtual face with virtual facial features corresponding to respective physical facial features of the person associated with the device;
        detecting, via the sensor, a change in one or more of the physical facial features of the person associated with the device, wherein the physical facial features indicate a physical facial expression of the person; and
        in response to determining that the physical facial expression breaches a criterion, modifying one or more of the virtual facial features of the virtual face so that the virtual face indicates a virtual facial expression that satisfies the criterion and that is different from the physical facial expression.

2. The method of claim 1, further comprising determining a scaling factor for the one or more physical facial features, and modifying the one or more virtual facial features of the virtual face based on the scaling factor and the detected change in the one or more physical facial features.

3. The method of claim 1, wherein the virtual facial expression is a scaled version of the physical facial expression.

4. The method of claim 1, further comprising modifying the one or more virtual facial features of the virtual face based on an identity associated with the representation of the person in the environment.

5. The method of claim 4, further comprising amplifying the one or more virtual facial features of the virtual face when the identity associated with the representation of the person in the environment is in a contact database associated with the device; and
dampening the one or more virtual facial features of the virtual face when the identity associated with the representation of the person in the environment is not in the contact database associated with the device.

6. The method of claim 1, further comprising modifying the one or more virtual facial features of the virtual face based on a plurality of respective scaling factors associated with each of a plurality of representations of a plurality of persons in the environment.

7. The method of claim 1, further comprising performing at least one of a random modification or a pseudorandom modification to the one or more virtual facial features of the virtual face.

8. The method of claim 7, further comprising performing the at least one of the random modification or the pseudorandom modification to the one or more virtual facial features of the virtual face on a condition that the environment corresponds to a game.

9. The method of claim 1, wherein detecting, via the sensor, the change in the one or more physical facial features of the person associated with the device comprises detecting an appearance of at least one of a physical ridge or a physical indentation on a face of the person associated with the device.

10. The method of claim 9, wherein the physical facial expression breaches the criterion on a condition that a height of the physical ridge breaches a threshold height; and
wherein modifying the one or more of the virtual facial features comprises scaling a height of a virtual ridge of the virtual face relative to the height of the physical ridge.

11. The method of claim 9, wherein the physical facial expression breaches the criterion on a condition that a depth of the physical indentation breaches a threshold depth; and
wherein modifying the one or more of the virtual facial features comprises scaling a depth of a virtual indentation of the virtual face relative to the depth of the physical indentation.

12. The method of claim 1, wherein detecting, via the sensor, the change in the one or more physical facial features of the person associated with the device comprises detecting a change in a shape of an eyebrow of the person associated with the device;
wherein the physical facial expression breaches the criterion on a condition that the change in the shape of the eyebrow breaches a threshold amount of change; and
wherein modifying the one or more of the virtual facial features comprises scaling a shape of a virtual eyebrow of the virtual face relative to the change in the shape of the eyebrow of the person associated with the device.

13. A device comprising:
a display;
a sensor;
one or more processors;
a non-transitory memory; and
one or more programs stored in the non-transitory memory, which, when executed by the one or more processors, cause the device to:
display, via the display, an environment that includes a representation of a person associated with the device, wherein the representation includes a virtual face with virtual facial features corresponding to respective physical facial features of the person associated with the device;
detect, via the sensor, a change in one or more of the physical facial features of the person associated with the device, wherein the physical facial features indicate a physical facial expression of the person; and
in response to determining that the physical facial expression breaches a criterion, modify one or more of the virtual facial features of the virtual face so that the virtual face indicates a virtual facial expression that satisfies the criterion and that is different from the physical facial expression.

14. The device of claim 13, wherein determining that the physical facial expression breaches the criterion comprises determining that an amount of change in the one or more of the physical facial features breaches a threshold amount of change; and
wherein an amount of change in the one or more of the virtual facial features does not breach the threshold amount of change.

15. The device of claim 13, wherein the one or more programs further cause the device to:
determine a scaling factor for the one or more physical facial features; and
modify the one or more virtual facial features of the virtual face based on the scaling factor and the detected change in the one or more physical facial features.

16. The device of claim 13, wherein modifying one or more of the virtual facial features comprises:
modifying the one or more virtual facial features of the virtual face based on an identity associated with the representation of the person in the environment.

17. A non-transitory memory storing one or more programs, which, when executed by one or more processors of a device with a display and a sensor, cause the device to:
display, via the display, an environment that includes a representation of a person associated with the device, wherein the representation includes a virtual face with virtual facial features corresponding to respective physical facial features of the person associated with the device;
detect, via the sensor, a change in one or more of the physical facial features of the person associated with the device, wherein the physical facial features indicate a physical facial expression of the person; and
in response to determining that the physical facial expression breaches a criterion, modify one or more of the virtual facial features of the virtual face so that the virtual face indicates a virtual facial expression that satisfies the criterion and that is different from the physical facial expression.

18. The non-transitory memory of claim 17, wherein the virtual facial expression is a scaled version of the physical facial expression.

19. The non-transitory memory of claim 17, wherein detecting, via the sensor, the change in the one or more physical facial features of the person associated with the device comprises detecting an appearance of at least one of a physical ridge or a physical indentation on a face of the person associated with the device.

20. The non-transitory memory of claim 17, wherein determining that the physical facial expression breaches the criterion comprises determining that an amount of change in the one or more of the physical facial features breaches a threshold amount of change; and wherein an amount of change in the one or more of the virtual facial features does not breach the threshold amount of change.

\* \* \* \* \*